United States Patent [19]

Tamamura et al.

[11] 4,293,335
[45] Oct. 6, 1981

[54] ROLL FOR MANUFACTURING FLOAT GLASS

[75] Inventors: Ryo Tamamura, Yokohama; Yukinori Kutsukake, Tokyo, both of Japan

[73] Assignee: Asahi Glass Company, Ltd., Tokyo, Japan

[21] Appl. No.: 132,628

[22] Filed: Mar. 21, 1980

Related U.S. Application Data

[63] Continuation of Ser. No. 962,713, Nov. 21, 1978, abandoned.

[30] Foreign Application Priority Data

Dec. 8, 1977 [JP]  Japan ................................ 52/146604

[51] Int. Cl.³ ............................................. C23F 7/04
[52] U.S. Cl. ....................................... 75/124; 148/31.5
[58] Field of Search ...................... 75/128 E, 122, 124; 148/31.5

[56] References Cited

U.S. PATENT DOCUMENTS

| 2,553,330 | 5/1951 | Post et al. | 75/128 |
| 3,729,308 | 4/1973 | Eiselstein et al. | 75/128 |
| 3,989,514 | 11/1976 | Fujioka et al. | 75/128 |
| 4,017,336 | 4/1977 | Foroulis | 148/31.5 |
| 4,082,575 | 4/1978 | Eastman | 148/31.5 |
| 4,147,536 | 4/1979 | Osumi et al. | 75/152 |

*Primary Examiner*—M. J. Andrews
*Attorney, Agent, or Firm*—Oblon, Fisher, Spivak, McClelland & Maier

[57] ABSTRACT

A lift-out roll for conveying a float glass ribbon formed on a bath of molten metal having excellent corrosion resistance to molten tin and high oxidation resistance is provided. The roll is made of a heat-resistant cast steel consisting essentially of 0.01–2.0 wt. % of a rare earth-metal; 0.1–3.0 wt. % of Al; 0.2–0.45 wt. % of C.; up to 2.0 wt. % of Si; up to 2.0 wt. % of Si; up to 2 wt. % of Mn; up to 0.04 wt. % of P; up to 0.04 wt. % of S; 19–22 wt. % of Ni; 23–27 wt. % of Cr and the balance of Fe.

3 Claims, 1 Drawing Figure

ROLL FOR MANUFACTURING FLOAT GLASS

This is a continuation of application Ser. No. 962,713, filed Nov. 21, 1978, now abandoned.

BACKGROUND OF THE INVENTION

1. Field of the Invention

The present invention relates to a roll for manufacturing a float glass. More particularly, it relates to a lift-out roll and conveyor roll for taking up and conveying a float glass ribbon formed on a bath of molten metal.

2. Description of the Prior Art

In the manufacture of a float glass, a molten glass is continuously fed from a glass melting furnace onto the surface of the bath of molten metal such as tin or tin alloy kept in non-oxidizing atmosphere.

The molten glass is floated on the bath of molten metal in a form of a continuous ribbon and it is forwardly transferred with a predetermined width and thickness to be smooth and flat and then, it is cooled and taken out from an outlet of a tank containing the bath of molten metal and is transferred to an annealing lehr by rolls.

Rolls for transferring the glass ribbon are disposed between the outlet of the glass in the tank of the bath of molten metal and the annealing lehr. The roll which is brought into contact with the lower surface of the glass ribbon immediately after being taken out from the bath to support and transfer the glass ribbon is called a lift-out conveyor roll or lift-out roll.

The lift-out roll is always brought into contact with the glass ribbon at high temperature such as about 550° to 650° C. and is also brought into contact with the molten tin adhered on the lower surface of the glass ribbon whereby the lift-out roll should have high temperature strength and excellent oxidation resistance and excellent corrosion resistance.

Heretofore, the lift-out roll is usually made of a product of JIS-SCH22 or SCH21 heat-resistant cast steel which corresponds to ASTM HK40 or HK30 known as 25 Cr-20 Ni heat-resistant cast steel.

The 25 Cr-20 Ni heat-resistant cast steel has a composition consisting essentially of 0.2–0.45 wt.% of C; up to 2.0 wt.% of Si; up to 2 wt.% of Mn; up to 0.04 wt.% of P; up to 0.04 wt.% of S; 19 to 22 wt.% of Ni; 23 to 27 wt.% of Cr and a balance of Fe and impurities.

It has been also proposed to use an improved steel containing less than 0.5 wt.% of Mo.

The high temperature mechanical strength of the lift-out roll made by casting such heat-resistant cast steel is substantially high enough, however, the oxidation resistance and the corrosion resistance to the molten tin are not high enough.

The lift-out roll is always brought into contact with the molten tin heated at 500° to 600° C. whereby the surface of the roll is corroded and oxidized in air to form a rough surface. Accordingly, the uneven pattern of the roll surface called "roll imprint" is transferred onto the surface of the glass ribbon to cause a defect by the formation of uneven or rough surface. This causes a deterioration of quality of the product and an increase of defective products.

When the lift-out roll is exchanged many times, the productivity is decreased so as to cause a cost increase.

The lift-out roll usually means first one to three conveyor rolls disposed at the outlet of the tank for the molten metal. The above-mentioned disadvantages are sometimes found for the conveyor roll or the lehr convey roll which follows the lift-out roll.

SUMMARY OF THE INVENTION

It is an object of the present invention to provide a conveyor roll especially a lift-out roll for manufacturing the float glass ribbon, which has excellent corrosion resistance to the molten tin and excellent oxidation resistance by modifying a composition of the heat-resistant cast steel.

The foregoing and other objects of the present invention have been attained by manufacturing the conveying roll by using an alloy obtained by incorporating 0.01 to 2.0 wt.% of rare earth metals and 0.1 to 3.0 wt.% of Al into 25 Cr-20 Ni heat-resistant cast steel.

DETAILED DESCRIPTION OF PREFERRED EMBODIMENTS

Figure 1:
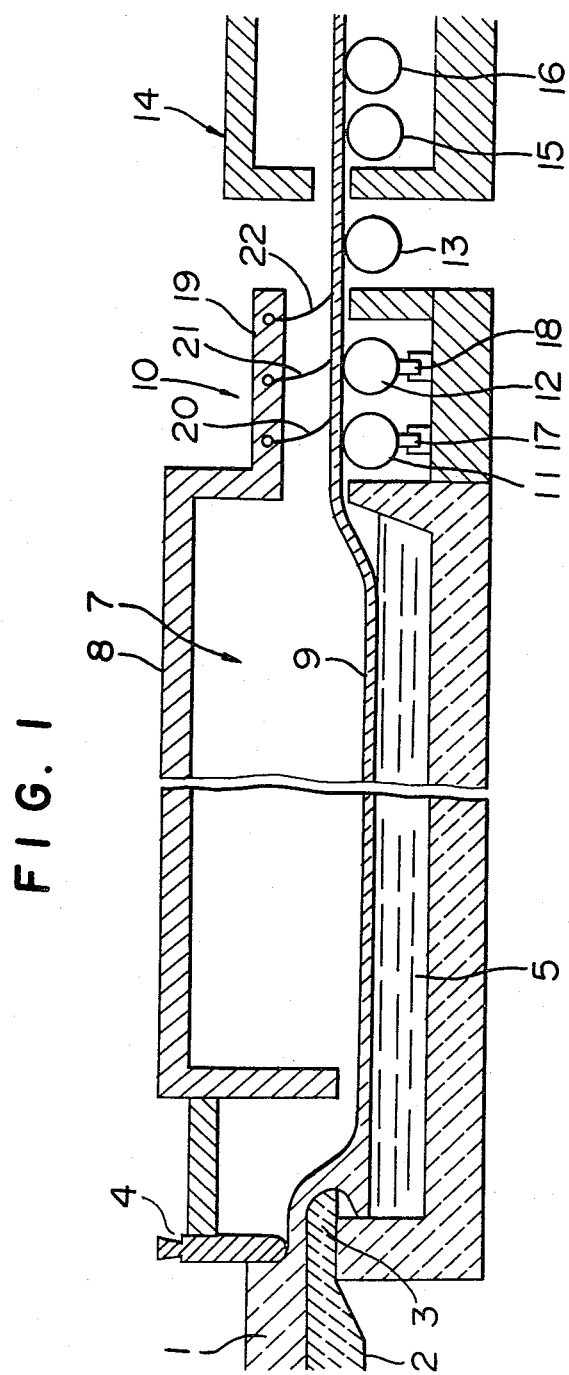
FIG. 1 is a partially sectional view of a tank structure containing a bath of molten metal and an annealing lehr used for manufacturing float glass.

FIG. 1 shows the tank containing the bath of molten metal and the annealing lehr, wherein reference numeral (1) designates a molten glass which floats on a forehearth (2) in the glass melting furnace and is fed from a spout (3) onto a bath of molten metal (5). The reference numeral (4) designates a tweel for controlling a flow rate of the molten glass and the lower end of the tweel is dipped in the molten glass.

The bath of molten metal (5) is kept in the tank (6) and a head space (7) of the bath (5) is closed in a roof structure (8) and a non-oxidizing atmosphere consisting of hydrogen and nitrogen is kept in the head space (7) to prevent an oxidation of the molten metal.

The molten glass fed onto the bath is spread in the form of a ribbon to form the glass ribbon (9).

During transferring forwardly of the glass ribbon (9) along the bath, predetermined width and thickness are given and the glass ribbon is smooth and flat. When the glass ribbon reaches to the cold end of the bath of molten metal, the glass ribbon is lifted and taken out by the lift-out rolls (11), (12) at the outlet of the tank and is fed into the annealing lehr (14) by the conveyor roll (13). The reference numerals (15), (16) designate annealing conveyor rolls.

In order to prevent entrance of air through a zone below the glass ribbon (9), the lift-out rolls (11), (12) contact with the sealing means (17), (18) disposed at the bottom of the outlet (10) of the tank.

On the other hand, the drapes (20), (21), (22) made of heat-resistant fabric are suspended from the roof structure (19) of the outlet to prevent entrance of air through the zone above the glass ribbon into the head space of the bath.

In accordance with the present invention, the lift-out roll is made of a heat-resistant cast steel consisting essentially of 0.05 to 2.0 wt.% of rare earth metal; 0.1 to 3.0 wt.% of Al; 0.2 to 0.45 wt.% of C; up to 2 wt.% of Si; up to 2 wt.% of Mn; up to 0.05 wt.% of P; up to 0.04 wt.% of S; 19 to 22 wt.% of Ni; 23 to 27 wt.% of Cr; and a balance of Fe.

The heat-resistant cast steel can comprise up to 0.5 wt.% of Mo.

The rare earth metal can be La, Ce, Pr, Nd, Pm, Sm, Eu, Gd, Tb, Dy, Ho, Er, Tm, Yb, Lu, Y and Sc. It is preferable to use Ce from an economical viewpoint.

It is preferable to use a mixture of rare earth metals comprising Ce as the main component which is called a "cerium misch metal".

One example of the composition of the cerium misch metal consists of 86.8 wt.% of Ce; 3.0 wt.% of La; 4.0 wt.% of Nd; 6.2 wt.% of Sm+Pr; and main impurities of 3.2 wt.% of Fe; 0.37 wt.% of Mg; 0.27 wt.% of Al and 0.73 wt.% of Si.

When the rare earth metal is incorporated in the base alloy, the contents of trace impurities and non-metallic inclusions in the alloy structure are decreased and the energy of the grain boundary is decreased to form a dense alloy texture whereby the high temperature mechanical strength is improved and the corrosion resistances, especially the corrosion resistances to molten tin, particularly inter-crystalline resistance, pin-hole resistance and sulfurization resistance, are remarkably improved.

An oxidized film having high density and high adhesiveness is formed at an early stage on the surface of the alloy whereby the diffusion of oxygen during the operation is highly controlled to greatly improve the oxidizability, and the castability and the machinability are also improved to decrease defects of the products.

Such effect is attained by incorporating more than 0.05 wt.% of rare earth metal. When the content is more than 2 wt.%, the fluidity of molten steel is decreased and the cleanness, the thermal stress resistance and the oxidation resistance of the cast glass ribbon are disadvantageously decreased.

When 0.1 to 3.0 wt.% of Al is incorporated in the 25 Cr-20 Ni heat-resistant cast steel, the corrosion resistance to the molten tin and the oxidation resistance of the alloy can be remarkably improved. The oxide film having high density and high adhesive force made of a main component of $\alpha$-$Al_2O_3$ is formed in an early stage on the surface of the alloy by incorporating Al whereby the corrosion of the rolls caused by the molten tin is prevented and oxidation is prevented and sulfurization resistance is improved.

When the content of Al is more than 3.0 wt.%, the fluidity of the molten steel is too low and the cleanliness of the cast product is too low and the metal composition is disadvantageously varied.

The rare earth metal and aluminum are simultaneously incorporated in the heat-resistant cast steel.

The cast steel having said composition is fabricated in a predetermined shape by the conventional casting method, especially the conventional centrifugal casting method, to prepare the rolls for manufacturing the float glass. It is possible to form only the surface of the rolls by the cast steel.

The oxide film is formed on the surfaces of the resulting rolls, especially the lift-out rolls, at a relatively early stage after the initiation of the use whereby the corrosion resistance and the oxidation resistance are improved.

In order to attain precisely the formation of the oxide film, the rolls are preferably treated by a pre-oxidation treatment.

In the pre-oxidation treatment, the rolls are heated under low oxygen partial pressure for oxidizing only the rare earth metal and aluminum without oxidizing Fe. It is preferable to heat the rolls in an atmosphere containing 95 to 99.8 wt.% of $N_2$ and a balance of $O_2$ and/or $H_2O$ such as 99.5 wt.% of $N_2$ and a balance of $O_2$ and/or $H_2O$ at 400° to 800° C.

The rolls can be optimumly used as the lift-out rolls and can be also used as the conveyor rolls.

EXAMPLE 1

Each test rod having a diameter of 1 cm and a length of 11 cm made of each heat-resistant cast steel of the composition shown in Table 1 was dipped in a bath of molten tin kept in nitrogen atmosphere at 550° C. for 6 hours and then taken out and the surface condition was observed.

In the column of the compositions shown in Table 1, HK-40 of the sample No. 10 is the 25 Cr-20 Ni heat-resistant cast steel having the following components.

| C | Si | Mn | P | S | Ni | Cr (wt.%) |
|---|---|---|---|---|---|---|
| 0.44 | 1.25 | 0.83 | 0.017 | 0.017 | 20.68 | 26.52 |
| (balance of Fe and impurities) | | | | | | |

The sample Nos. 20, 30, 40, 50 and 60 were respectively prepared by incorporating the cerium misch metal (referring to as RE) and/or Al into the heat-resistant cast steel at a weight ratio of 100 of the heat-resistant cast steel.

The sample Nos. 11, 21, 31, 41, 51 and 61 were respectively prepared by heat-treating in an atmosphere containing 99.5 wt.% of $N_2$ and a balance of $H_2O$ and $O_2$ at 550° C. for 1 hour to oxidize the surface as the pre-oxidation treatment.

The results of the dipping tests are shown in the right column of Table 1 wherein the term "corrosion depth" means a decreased dimension of the thickness caused by corrosion of the surface of the sample; and the term "Sn diffusion depth" means a depth of Sn diffusion measured by a microscopic observation of the sectional surface; and the term "Sn attachment" means the existence or the condition of the Sn attachment on one surface of the sample taken up. The corrosion resistance to tin is higher depending upon decreasing Sn attachment.

EXAMPLE 2

Each long-term dip test was carried out by intermittently dipping each sample of eight kinds of sample Nos. 10, 11, 20, 21, 50, 51, 60 and 61 shown in Example 1, in a bath of molten tin for manufacturing a float glass.

The bath of molten tin was kept in an atmosphere containing 8 wt.% of $H_2$ and a balance of $N_2$ at 560° C.

The sample was dipped 10 times per minute for about 2 seconds each time. The sample was observed after 12 days, 27 days and 57 days from the initiation.

The results are shown in Table 2.

TABLE 1

| Sample No. | Composition | Result of dip test | | |
|---|---|---|---|---|
| | | Corrosion depth | Sn diffusion depth | Sn attachment |
| 10 | HK40 | 70μ | 30μ | entire surface |
| 11 | HK40 (pre-OX) | 10μ | 40μ | partial |
| 20 | HK40 + 0.5RE | 35–60μ | 60–70μ | entire surface |
| 21 | HK40 + 0.5RE (pre-OX) | 10μ | 90μ | extremely |

TABLE 1-continued

| Sample No. | Composition | Result of dip test | | |
|---|---|---|---|---|
| | | Corrosion depth | Sn diffusion depth | Sn attachment |
| 30 | HK40 + 0.5Al | 30μ | 50μ | partial entire surface |
| 31 | HK40 + 0.5Al (pre-OX) | 0 | 0 | nil |
| 40 | HK40 + 1.0Al | 30 μ | 100μ | entire surface |
| 41 | HK40 + 1.0Al (pre-OX) | 0 | 0 | nil |
| 50 | HK40 + 2.0Al | 50μ | 90μ | entire surface |
| 51 | HK40 + 2.0Al (pre-OX) | 0 | 0 | nil |
| 60 | HK40 + 2.0Al + 0.5RE | 15μ | 75μ | partial |
| 61 | HK40 + 2.0Al + 0.5RE (pre-OX) | 0 | 0 | nil |

*pre-OX means pre-oxidation treatment

TABLE 2

| Sample No. | Long-term dip test results | | |
|---|---|---|---|
| | after 12 days | after 27 days | after 57 days |
| 10 | No abnormality | Corroded over the entire surface | Corroded over the entire surface |
| 11 | No abnormality | Sn attached partially | Corroded over the entire surface |
| 20 | No abnormality | No abnormality | Corroded partially |
| 21 | No abnormality | No abnormality | Corroded partially |
| 50 | No abnormality | No abnormality | Sn attached partially |
| 51 | No abnormality | No abnormality | Sn attached partially |
| 60 | No abnormality | No abnormality | No abnormality |
| 61 | No abnormality | No abnormality | No abnormality |

As described above, resistance to attachment molten tin and excellent oxidation resistance, life of the roll of the present invention as the lift-out roll can be prolonged about 2 to 3 times in comparison with the conventional rolls. The rolls of the present invention are also useful as the conveyor rolls for the float glass as well as the lift-out roll.

What is claimed is:

1. A roll for conveying a float glass ribbon formed on a bath of molten metal, having excellent corrosion resistance to molten tin and high oxidation resistance, at least the surface of said roll being made of a heat-resistant cast steel consisting essentially of 0.01-2.0 wt.% of a rare earth metal mixture, and 0.1-3.0 wt.% of Al, 0.2-0.45 wt.% of C, up to 2.0 wt.% of Si, up to 2 wt.% of Mn, up to 0.04 wt.% of P, up to 0.04 wt.% of S, 19-22 wt.% of Ni, 23-27 wt.% of Cr, and the balance of Fe, said rare earth metal mixture comprising about 86.8 wt.% of Ce, about 3.0 wt.% of La, about 4.0 wt.% of Nd, about 6.2 wt.% of Sm plus Pr, and with main impurities of about 3.2 wt.% of Fe, about 0.37 wt.% of Mg, about 0.27 wt.% of Al and about 0.73 wt.% of Si.

2. The roll claimed in claim 1, said roll further comprising an oxide film on the surface of said roll formed by a pre-oxidation treatment.

3. A roll as in claim 1 wherein the surface of the roll is oxidized prior to use by being heat treated in an atmosphere containing about 99.5 wt.% of $N_2$ and a balance of $H_2O$ and $O_2$ at 550° C. for one hour.

* * * * *